(12) United States Patent
Kuiper et al.

(10) Patent No.: US 7,436,598 B2
(45) Date of Patent: Oct. 14, 2008

(54) VARIABLE SHAPE LENS

(75) Inventors: Stein Kuiper, Eindhoven (NL);
Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 171 days.

(21) Appl. No.: 10/556,285

(22) PCT Filed: May 12, 2004

(86) PCT No.: PCT/IB2004/050639

§ 371 (c)(1),
(2), (4) Date: Nov. 9, 2005

(87) PCT Pub. No.: WO2004/102253

PCT Pub. Date: Nov. 25, 2004

(65) Prior Publication Data

US 2006/0274425 A1 Dec. 7, 2006

(30) Foreign Application Priority Data

May 14, 2003 (EP) .................................. 03101328

(51) Int. Cl.
*G02B 1/06* (2006.01)
(52) U.S. Cl. ...................... 359/665; 359/666
(58) Field of Classification Search ................. 359/886, 359/665, 227, 296, 619, 666, 667–670; 362/512
See application file for complete search history.

(56) References Cited

U.S. PATENT DOCUMENTS

| | | | | |
|---|---|---|---|---|
| 4,477,158 A | * | 10/1984 | Pollock et al. | .............. 351/169 |
| 5,774,273 A | * | 6/1998 | Bornhorst | .................... 359/665 |
| 5,864,128 A | | 1/1999 | Plesko | |
| 5,973,852 A | * | 10/1999 | Task | ........................... 359/666 |
| 6,344,930 B1 | * | 2/2002 | Kaneko et al. | .............. 359/666 |
| 6,369,954 B1 | * | 4/2002 | Berge et al. | ................. 359/666 |
| 2001/0017985 A1 | | 8/2001 | Tsuboi | |
| 2006/0262433 A1 | * | 11/2006 | Hendriks et al. | ............ 359/846 |

FOREIGN PATENT DOCUMENTS

DE 19710668 A1 9/1998

(Continued)

OTHER PUBLICATIONS

B. Berge et al., "Variable Focal Lens Controlled by an External Voltage: An Application of Electrowetting", European Physical Journal E. Soft Matter, EDP Sciences, IT, vol. 3, No. 2, Oct. 2000, pp. 159-163.

(Continued)

*Primary Examiner*—Hung X. Dang
*Assistant Examiner*—Vipin M Patel
(74) *Attorney, Agent, or Firm*—Michael E. Belk

(57) ABSTRACT

A variable lens system includes a chamber with an optical axis extending through the chamber. The chamber contains a first fluid and a second fluid in contact over a meniscus extending transverse the optical axis. The perimeter of the meniscus is fixedly located on an internal surface of the chamber. The fluids are substantially immiscible and have different indices of refraction. A pump is arranged to controllably alter the shape of the meniscus by altering the relative volume of each of the fluids contained within the chamber.

39 Claims, 11 Drawing Sheets

FOREIGN PATENT DOCUMENTS

| | | | | |
|---|---|---|---|---|
| JP | 401302301 A | * | 12/1989 | ................ 359/665 |
| JP | 2000121969 A1 | | 4/2000 | |
| JP | 01231661 A1 | | 4/2002 | |
| WO | WO9918456 A1 | | 4/1999 | |
| WO | WO02069016 A2 | | 9/2002 | |
| WO | WO03034748 A1 | | 4/2003 | |
| WO | WO2004/027769 A1 | * | 10/2003 | |
| WO | WO 2004027769 A1 | * | 4/2004 | |
| WO | WO2004102253 A1 | | 11/2004 | |
| WO | WO2004102910 A1 | | 11/2004 | |
| WO | WO2004102989 A1 | | 11/2004 | |

OTHER PUBLICATIONS

Written Opinion_PCTIB2004050639.
ISR_PCTIB2004050639.

* cited by examiner

VARIABLE SHAPE LENS

FIELD OF THE INVENTION

The present invention relates to a variable lens, to optical devices including such a lens, and to methods of manufacturing such lenses and such devices.

BACKGROUND OF THE INVENTION

A lens is a device that can focus (converge or diverge) one or more wavelengths of light. The term light is understood to include both visible electromagnetic radiation, and other wavelengths of electromagnetic radiation.

A variable (or adjustable) lens is a lens in which one or more properties of the lens can be controllably adjusted e.g. in which either the focal length or the position of the lens can be altered.

DE 19710668 describes a variable lens system 40, as illustrated in FIGS. 1A and 1B. The lens system 40 comprises a resilient membrane 42 filled with a fluid 44. The pressure of the fluid 44 within the membrane is controlled by means of a pump 46. The dotted line illustrates the optical axis 90 of the lens system 40. The membrane 42 acts as a variable lens, with the shape (and hence power) of the lens varying in dependence upon the pressure of the fluid 44. FIG. 1A shows the fluid 44 at a low pressure i.e. with the membrane 42 forming a biconcave lens. FIG. 1B shows the fluid 44 at a higher pressure, with the membrane 42 forming a bi-convex lens.

Such a system posses a number of disadvantages. Due to the movement of the membrane surface, it is difficult to maintain good optical properties and it is susceptible to vibrations. Further, it is susceptible to mechanical fatigue. Control of the shape of the lens is not only dependent upon both gravity and the pressure of the fluid 44, but also the resilience of the membrane 42. Consequently, obtaining a range of desired lens shapes can be problematic, particularly if the elasticity of the membrane 42 changes over time. Additionally, flexible membranes are not normally gas tight, resulting in the evaporation of the fluid from the device over time.

Variable focus lenses based on electrowetting devices are also known. Electrowetting devices are devices that utilise the electrowetting phenomenon to operate. In electrowetting, the three-phase contact angle is changed with applied voltage. The three-phases constitute two fluids and a solid.

International patent application WO 99/18456 describes a variable focus lens utilising the electrowetting effect. FIG. 2 is a cross-sectional view of such a typical optical device. The device has two immiscible fluids 80, 87 confined in a sealed space 92 (i.e. a chamber or cavity). The term immiscible indicates that the two fluids do not mix. The first fluid 80 is an insulator (e.g. silicone oil) and the second fluid 87 electro conductive (e.g. a mixture of water and ethyl alcohol). The first fluid 80 and the second fluid 87 have different refractive indices.

A voltage from a voltage supply 50 can be applied to the two electrodes 51, 52 so as to produce an electric field between the first fluid 87 and the electrode 52 (an insulating layer 65 prevents the second electrode 52 contacting the conductive second fluid).

By varying the voltage applied to the second fluid 87, the shape of an interface 85 between the first fluid 80 and the second fluid 87 is altered, so as to change the lens function provided by the interface 85. The device in FIG. 2 has a water-repellent film 60 of diameter D1 on the insulating layer 65 surrounded by a ring of a hydrophilic agent 70 so as to locate the first fluid 80.

This electrowetting lens also possesses a number of disadvantages. For instance, the lens shape is defined by a variable voltage, with the lens shape being affected by any non-uniformities of the insulating layer. The configuration requires a relatively high voltage to alter the shape of the interface 85. Further, the insulating layer may suffer from charging (especially at high voltages). If the insulating layer is charged unequally, this will lead to unequal contact angles, and thus to non-spherical lens. Further, it is not possible for such a lens to vary from being a positive power lens to a negative power lens (or vice versa).

It is an aim of embodiments of the present invention to provide a variable lens that addresses one or more problems of the prior art, whether referred to herein or otherwise. It is also an aim of the present invention to provide optical devices incorporating such lenses, and methods of manufacturing such lens and such devices.

STATEMENTS OF THE INVENTION

In a first aspect, the present invention provides a variable lens comprising: a chamber; an optical axis extending through the chamber; the chamber containing a first fluid and a second fluid in contact over a meniscus extending transverse the optical axis, the perimeter of the meniscus being fixedly located on an internal surface of the chamber, the fluids being substantially immiscible and having different indices of refraction; and at least one pump arranged to controllably alter the shape of the meniscus by altering the relative volume of each of said fluids contained within the chamber.

The meniscus between the two fluids acts as a lens, and so the effective shape of the lens can easily be adjusted by changing the shape of the meniscus. As no mechanical components are required within the optical path of the lens, then the optical path does not suffer from mechanical wear and tear. Further, the lens shape is not directly related to a change in voltage, thus making the lens independent of charging effects within the insulating layer. Further, the design allows lenses to be produced that are adjustable from being positive power lenses to negative power lenses (and vice versa), thus allowing a wide range in design freedom.

In another aspect, the present invention provides an optical device comprising a variable lens, the lens comprising: a chamber; an optical axis extending through the chamber; the chamber containing a first fluid and a second fluid in contact over a meniscus extending transverse the optical axis, the perimeter of the meniscus being fixedly located on an internal surface of the chamber, the fluids being substantially immiscible and having different indices of refraction; and at least one pump arranged to controllably alter the shape of the meniscus by altering the relative volume of each of said fluids contained within the chamber.

In a further aspect, the present invention provides a method of manufacturing a variable lens, the method comprising: providing a chamber, with an optical axis extending through the chamber placing a first fluid and a second fluid in the chamber such that the two fluids are in contact over a meniscus extending transverse the optical axis, the perimeter of the meniscus being fixedly located on an internal surface of the chamber, the fluids being substantially immiscible and having different indices of refraction; and providing at least one pump arranged to controllably alter the shape of the meniscus by altering the relative volume of each of said fluids contained within the chamber.

In another aspect, the present invention provides a method of manufacturing an optical device, the method comprising the steps of: providing a variable lens, the variable lens comprising: a chamber; an optical axis extending through the chamber; the chamber containing a first fluid and a second fluid in contact over a meniscus extending transverse the optical axis, the perimeter of the meniscus being fixedly located on an internal surface of the chamber, the fluids being substantially immiscible and having different indices of refraction; and at least one pump arranged to controllably alter the shape of the meniscus by altering the relative volume of each of said fluids contained within the chamber.

Other aims and advantages of the present invention will be apparent from the preferred features as set out in the accompanying claims.

BRIEF DESCRIPTION OF DRAWINGS

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENTS

Figure 1A:
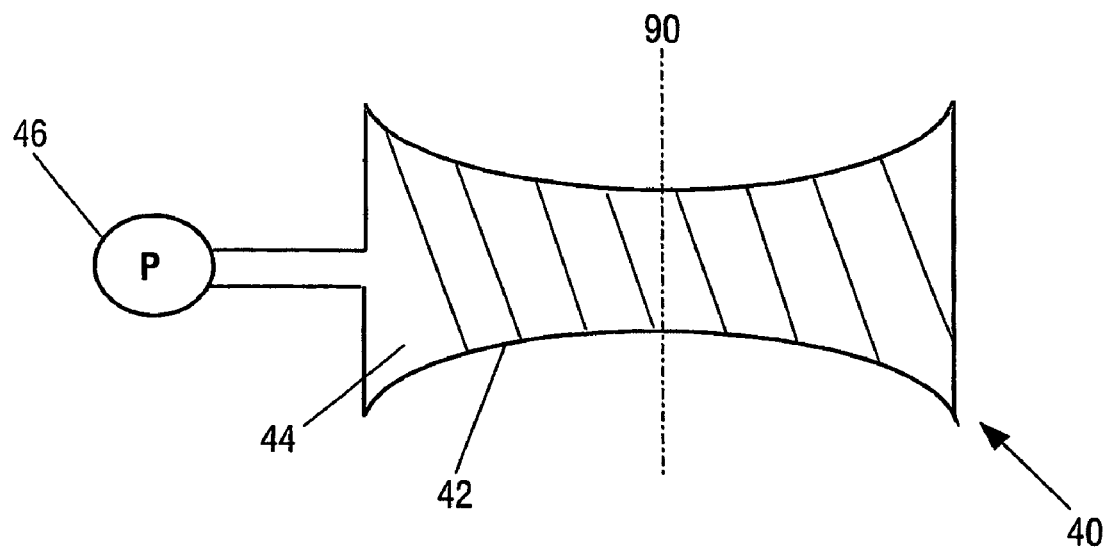
FIGS. 1A and 1B show a known variable lens in schematic cross-section in two different configurations.
Figure 1B:
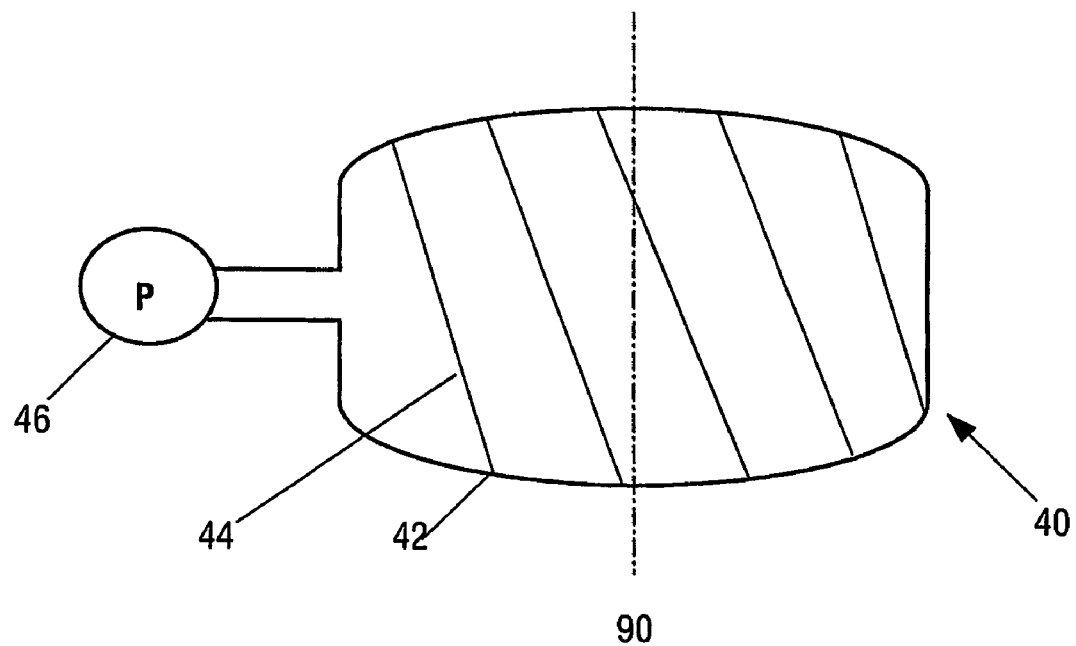
Figure 2:
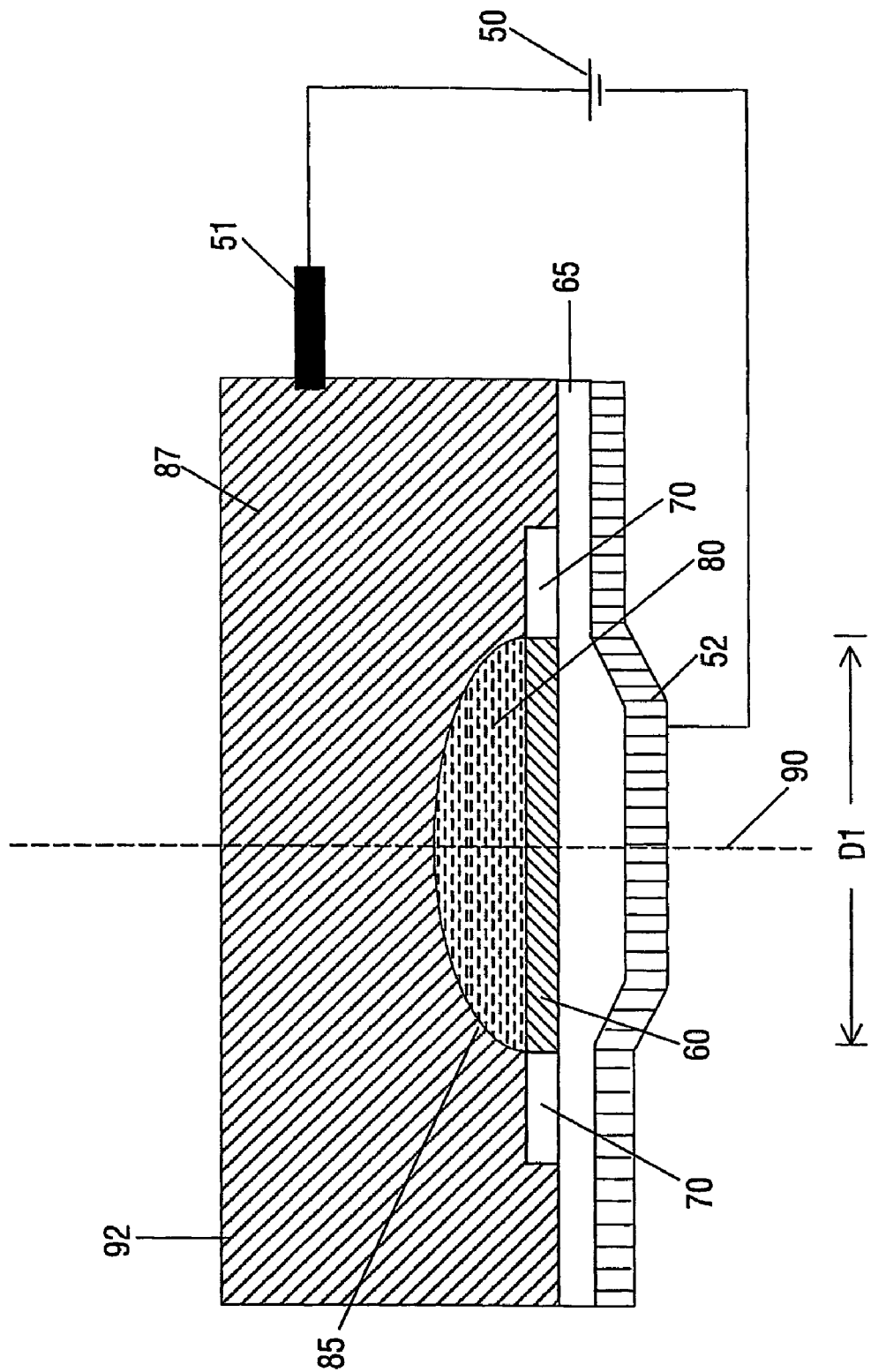
FIG. 2 illustrates a schematic cross-section of a known type of electrowetting variable lens.
Figure 3A:
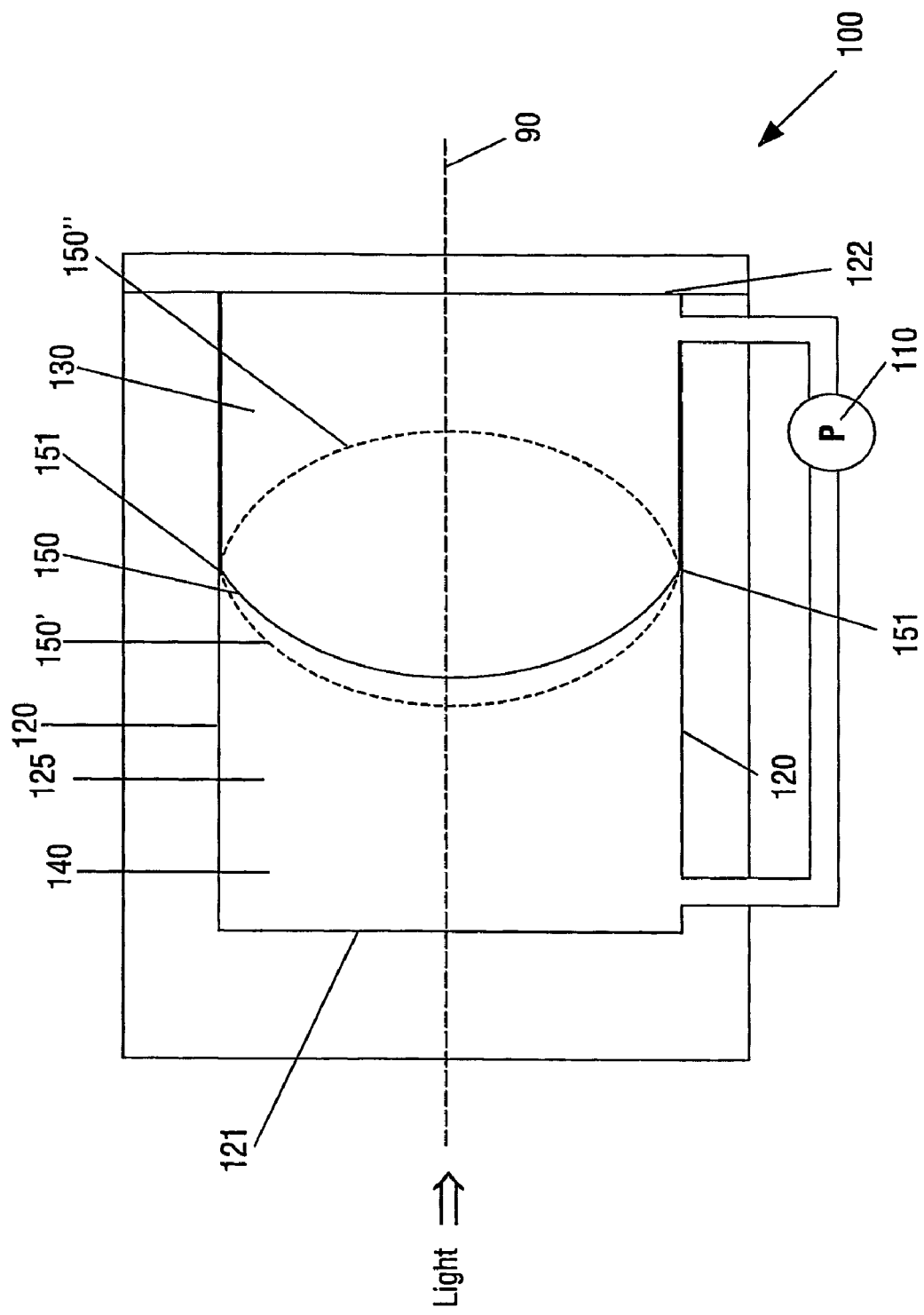
FIGS. 3A and 3B illustrate respectively a schematic cross-section of a variable lens and the equivalent optical function provided by the variable lens in accordance with a first embodiment of the present invention.

FIG. 3A shows a variable lens in accordance with a first embodiment of the present invention. The lens 100 can be regarded as being formed of two distinct elements: a lens function formed by the meniscus 150 between two fluids 130, 140, and a pump 110 arranged to alter the shape of the lens function.

A fluid is a substance that alters its shape in response to any force, that tends to flow or to conform to the outline of its chamber, and that includes gases, liquids, vapours, and mixtures of solids and liquids capable of flow.

The two fluids 130, 140 are substantially immiscible i.e. the two fluids do not mix. The two fluids 130, 140 have different refractive indices. A lens function is thus provided by the meniscus 150 formed along the contact area of the two fluids, as the fluids have different refractive indices. A lens function is the ability of the meniscus 150 to focus (converge or diverge) one or more wavelengths of the light. In this particular embodiment, it is assumed that fluid 130 has a higher refractive index than fluid 140.

The two fluids are preferably of substantially equal density, so as to minimise the effects of gravity upon the lens 100.

The fluids 130, 140 are enclosed within a chamber 125. In this embodiment the chamber 125 takes the form of a longitudinally extending tube, the tube having side walls defined by internal surfaces 120. An optical axis extends longitudinally through the tube. In this particular example, the tube is a cylindrical tube, of constant circular cross-sectional area, and the optical axis is co-axial with the tube axis. Additional walls 121, 122 extend across the ends of the tubes so as to form a chamber 125 enclosing the fluids. At least the portions of the walls 121, 122 of the chamber 125 lying along the optical axis 90 are transparent. If desired, one or both of these walls 121, 122 may be lens shaped.

The meniscus 150 between the two fluids 130, 140 extends transverse the optical axis 90 of the lens 100. The term transverse indicates that the meniscus crosses (i.e. it extends across) the optical axis, and it is not parallel to the optical axis; the meniscus 150 may cross the optical axis 90 at any desired angle. The perimeter of the meniscus 150 is defined by the side walls 120 of the tube.

Typically, in order to locate the fluids 130, 140 within the desired portion of the chamber 125, different areas of the chamber will have different wettabilities for each fluid, such that each fluid will be attracted by a respective area. Wettability is the extent by which an area is wetted (covered) by a fluid. For instance, if the fluid 130 is water, and the fluid 140 is an oil, then the internal surface of the wall 122 may be hydrophilic so as to attract the fluid 130, and not attract the fluid 140.

The perimeter of the meniscus 150 contacts the surfaces 120 of the side walls of the tube. The perimeter of the meniscus is fixedly located on the surface 120. In other words, the position 151 at which the perimeter of the meniscus 150 touches the surface 120 is fixed i.e. the meniscus perimeter is pinned to the surface. In this particular embodiment, the meniscus perimeter is fixed to the surface by an abrupt change in wettability of the surface at position 151 e.g., at position 151 the surface 120 changes from being hydrophobic to hydrophilic.

The shape of the meniscus 150 is determined by both the pressure difference between the two fluids and by the internal diameter of the cylinder. The meniscus 150 illustrated is convex (as viewed from fluid 130).

A pump 110 connected to the fluid filled chamber 125 is arranged to pump quantities of one or more of the fluids to and from the chamber 125.

In this particular example, the pump 110 is arranged to simultaneously increase the volume of the fluid 130 and to decrease the volume of the fluid 140 (and vice versa), so as to maintain the same total volume of the two fluids within the chamber 125. The result will be that the shape of the meniscus 150 will be changed, as the perimeter of the meniscus is pinned to the surface 120.

For instance, if extra fluid 130 is added to the chamber 125, then the meniscus shape may change to be more convex i.e. to form the meniscus indicated by the dotted line 150'. Alternatively, if extra fluid 140 is added, then the meniscus may change shape to that indicated by the dotted line 150" i.e. the meniscus becomes concave (as viewed from fluid 130). It will be appreciated that by altering the volumes of the fluids within the chamber 125, then the meniscus shape can be changed from being convex, to planar, to concave.

It is expected that the maximum curvature of the meniscus shape would be when the meniscus forms a half-sphere. However, it will be appreciated that there is likely to be a threshold pressure at which the meniscus moves, when the pressure becomes so great that the pinning action of the meniscus is overcome, with the result that the meniscus will subsequently move position. Such a threshold pressure is dependent on the magnitude of the change in wettability.

Figure 3B:
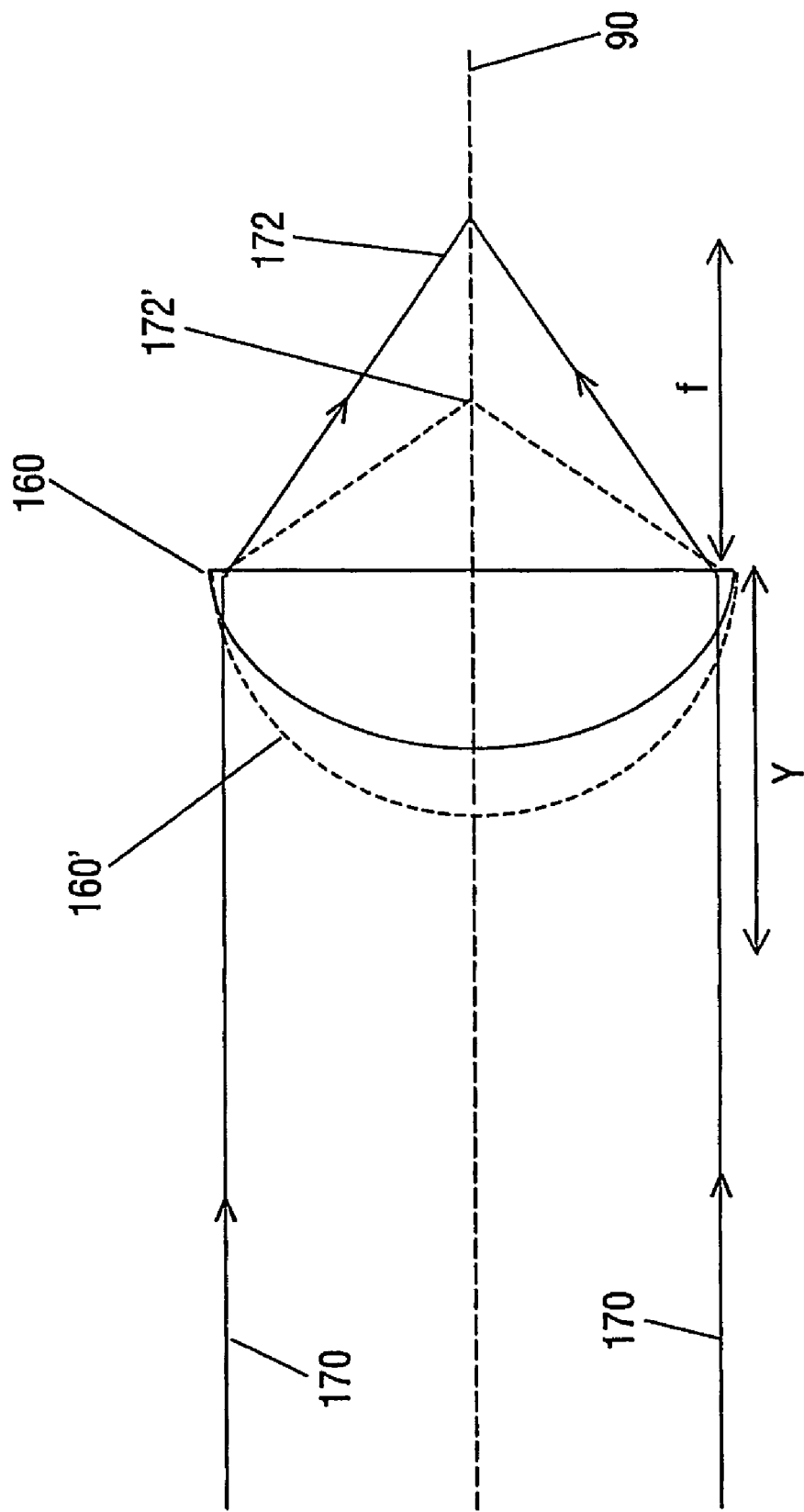

FIG. 3B illustrates the effective optical function, when the refractive index of fluid 130 is higher than fluid 140, provided by the meniscus 150 i.e. it is that of a piano convex lens 160, of focal length f. In other words, the meniscus 150 effectively provides the function of a lens 160, which would bring parallel light 170 (incident upon the lens in a direction parallel to the optical axis 90), to a focus 172 a distance f from the lens.

When the meniscus has changed shape (i.e. to the shape shown by the dotted line 150' in FIG. 3A), then the effective lens function also changes, to that shown by dotted line 160'. As the meniscus 150' is more curved than meniscus 150, then the lens will be of a higher power i.e. it will have a shorter focal length, bringing parallel light 170 with a focus 172, to a focus 172' which is a shorter distance from the lens.

In the embodiment shown in FIG. 3A, the meniscus 150 is fixedly located by a change in the wettability of the surface. However, it will be appreciated that other techniques may be used to fix the position of the meniscus perimeter.

Figure 4A:
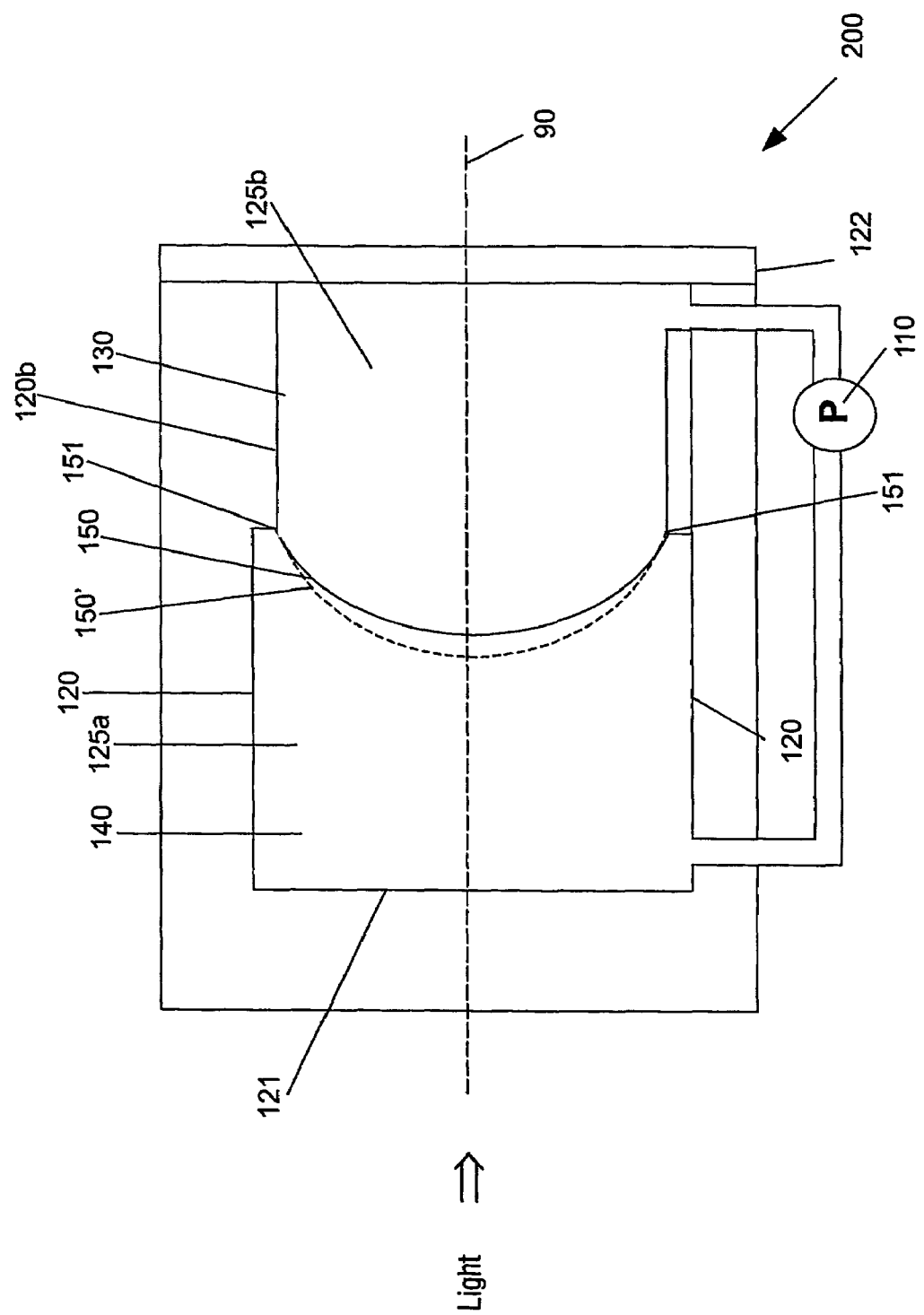
FIGS. 4A-4C illustrates schematic cross-sections of variable lenses in accordance with further embodiments of the present invention.
Figure 4B:
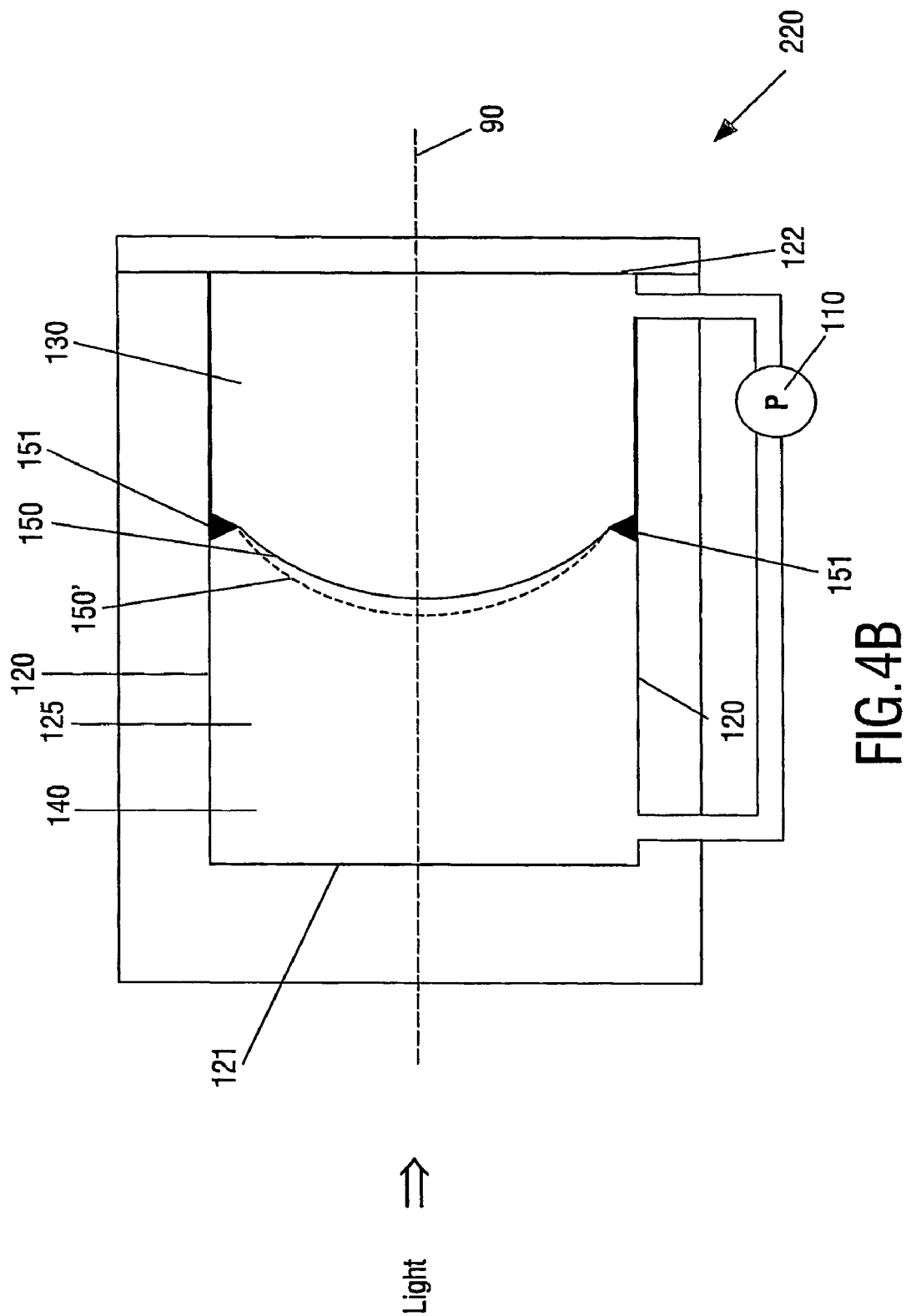
Figure 4C:
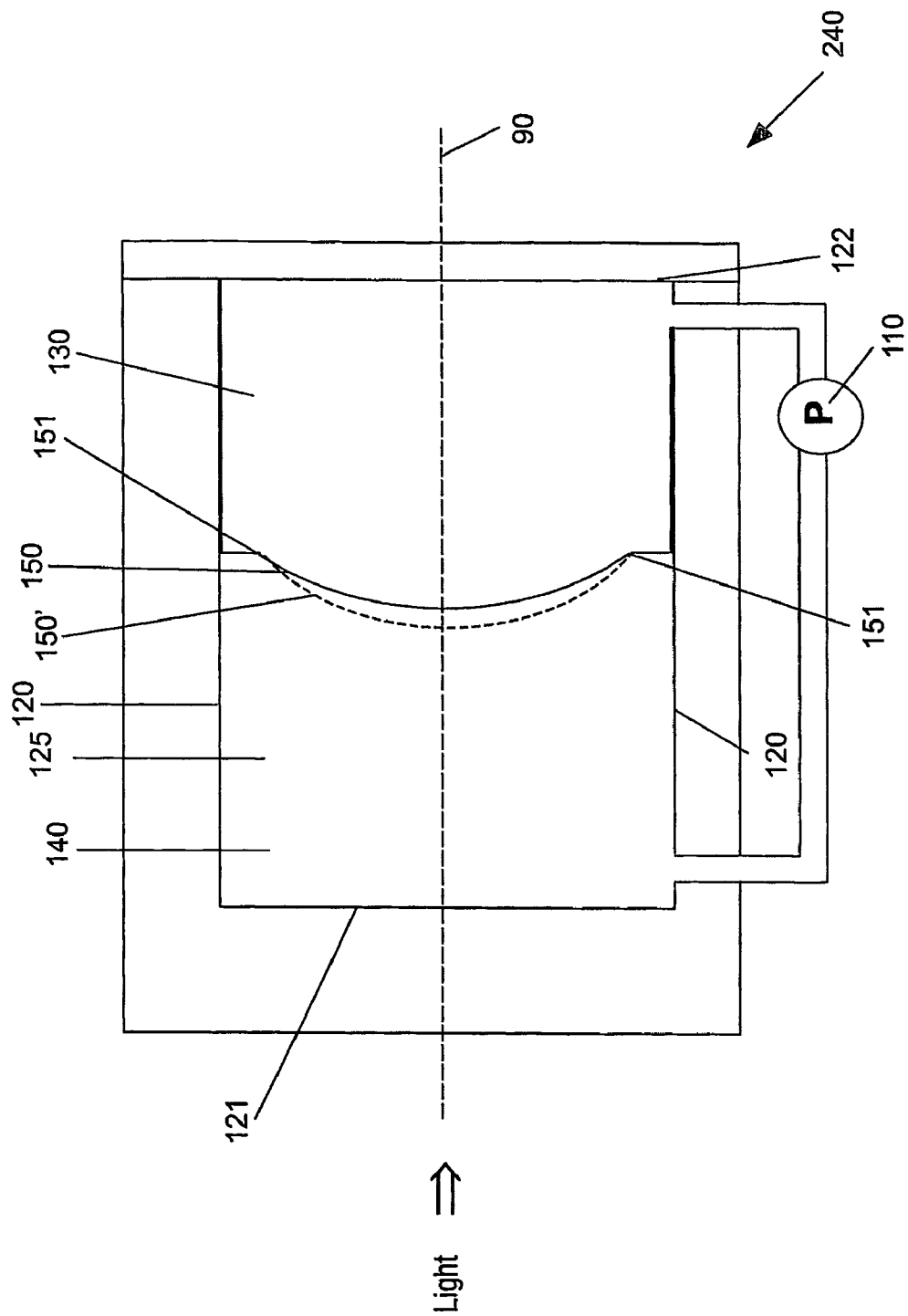

For instance, FIGS. 4A, 4B and 4C show cross sectional views of variable lenses 200, 220, 240 in accordance with further embodiments of the present invention. Identical reference numerals denote similar features.

The chamber 125 of the device 200 can be envisaged as being in two portions (125a, 125b). Both portions 125a, 125b are cylindrically circular tubes, each closed at one end. The two portions 125a and 125b are of different circular cross-sections, with one portion (125b) being smaller than the other. Consequently, where the two tubes are joined, a step with an external corner is produced.

In this particular embodiment, the meniscus is pinned in position by a change in geometry of the surface 120 that the meniscus contacts. In particular, the perimeter of the meniscus contacts the corner (position 151) of the step in surface 120. This abrupt change in geometry is sufficient to fixedly locate the perimeter of the meniscus.

It will be appreciated that other changes in geometry may be used to fixedly locate the meniscus 150. Preferably, the position at which the meniscus contacts is a surface undergoing an abrupt change in angle. The greater the change in angle (e.g. the more acute or sharper the edge or corner), the greater the pinning action of the meniscus, thus allowing the meniscus to undergo a greater change in radius of curvature.

By way of example, FIG. 4B shows a device 220 in which an annulus (or ring) extends around a portion of the internal surface 120. Preferably, the plane of the annulus is perpendicular to the optical axis 90. The annulus has a triangular cross-section, such that a sharp corner is formed on the internal surface of the ring. The meniscus contacts this corner (position 151).

FIG. 4C shows an alternative embodiment of the present invention, generally similar to that shown in FIG. 4B. In this particular instance, the annulus is very thin, such that the internal surface of the annulus is effectively a spike. The meniscus 150 contacts the ring at this sharp internal surface (position 151). Other appropriate changes in geometry will be apparent to the skilled person as being suitable to fix the position of the meniscus 150.

If desired, the meniscus 150 may be pinned in position by both a change in geometry and a change in wettability. For instance, in FIGS. 4A, 4B and 4C the pinning effect may be enhanced by abruptly varying the wettability of the chamber wall at the point where the sharp corner is located.

Figure 5:
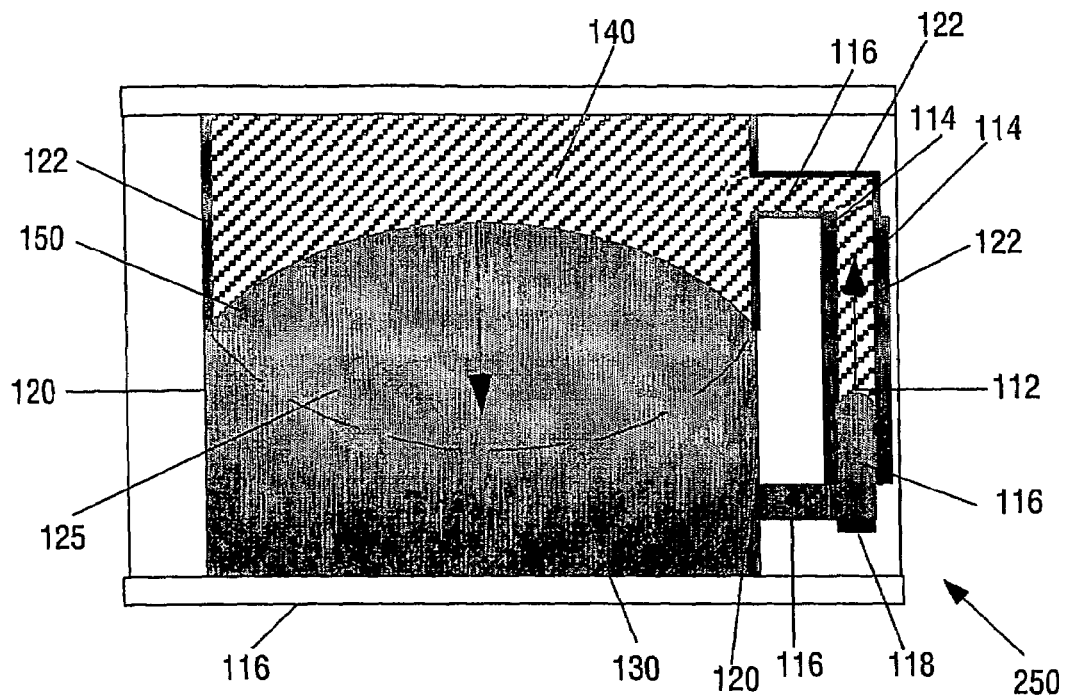
FIG. 5 illustrates a schematic cross-section of a variable lens in accordance with a further embodiment of the present invention.

It will be appreciated that pumping of fluids into and out of the chamber 125 can be done in many ways, for instance by a mechanical pump. FIG. 5 shows an alternative embodiment of the present invention, in which the pumping is performed by electrowetting.

In the device 250 shown in FIG. 5, it is assumed that the cylinder defining the chamber 125 containing the two fluids is formed of a hydrophilic material e.g. glass. The first fluid 130 in this embodiment, is water, with the second fluid 140 being an oil. The upper portion 122 of the internal surface 120 defining the chamber 125 is coated with a hydrophobic layer. The result will be that the water will wet the glass, but not the hydrophobic coating. Consequently, this change in wettability will pin the perimeter of the meniscus 150 into position. It will be appreciated that the quality of the circumference of the lens function provided by the meniscus is determined by the accuracy by which the coating can be deposited (or removed if the coating is first applied to all of the internal surface, then selectively removed).

For instance, the layers of material could be partially removed by a lathe, or by lithographic techniques. Precise changes in geometry may be obtained by a number of techniques, including injection moulding.

A channel 116 connects the two immiscible liquids (water and oil). The liquids can be pumped through this channel 116, and consequently the volume of the liquids within the chamber 125 will be changed, and hence the radius of curvature of the meniscus 150 in the chamber also changed.

Within the channel 116 a further meniscus 112 exists, defining the interface between the two liquids. Electrowetting is utilised to change the curvature (and hence position) of this meniscus 112, with the result being that the volume of fluids within the chamber 125 will be altered. Electrowetting is performed by applying a voltage between the electrodes 114 and the electrode 118, such that the three-phase contact angle between the two fluids 130, 140 and the surface of the channel 116 changes.

In this particular embodiment, the radius of the channel 116 is much smaller than the radius of the chamber 125. Consequently, a relatively small change in the contact angle of the meniscus 112 in the channel 116 will lead to a much larger change in contact angle of the meniscus 150 in the chamber 125. The channel 116 must be long enough to accommodate the desired range and movement of the meniscus 112. If desired, the channel 116 could be formed of a tube e.g. a flexible tube, or by a second cylinder (e.g. a larger cylinder could be placed around the first cylinder, similar to the arrangement shown in FIG. 4).

Figure 6:
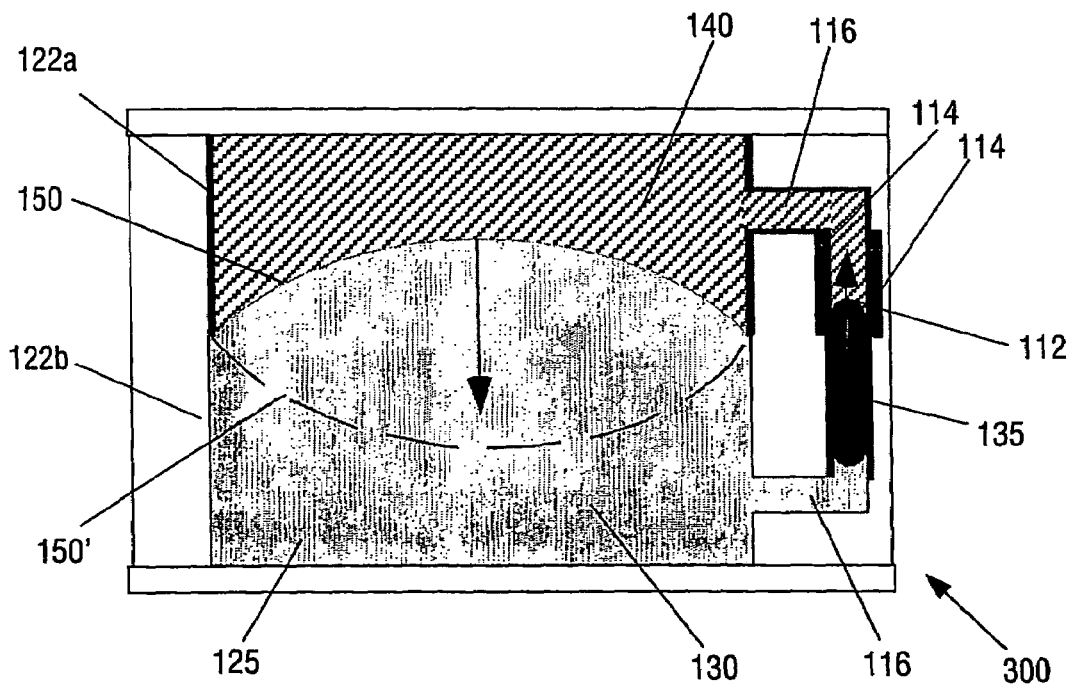
FIG. 6 illustrates a schematic cross-section of a variable lens in accordance with another embodiment of the present invention.

FIG. 6 shows a variable lens 300 in accordance with another embodiment of the present invention. In this particular embodiment, the two fluids 130, 140 defining the meniscus 150 of the lens are immiscible, but are not necessarily suitable for electrowetting. For instance, the first fluid 130 could be a fluorinated oil, with the second fluid 140 being a hydrocarbon oil. The fluorinated oil has a very low refractive index, which makes it possible to obtain a large difference in refractive index between the two fluids.

The perimeter of the meniscus 150 is again pinned in position by an abrupt change in wettability. The upper portion of the internal surface of the chamber 125 is coated by a layer that is wettable by hydrocarbon oil (e.g. polyethylene), with the remainder of the internal surface coated by a layer wettable by fluorinated oil (e.g. Teflon). A volume of water 135 (termed a "water slug") lies within the channel 116. Assuming the hydrocarbon oil 140 is suitable for electrowetting, then the water slug in the channel can be moved with electrowetting, this being reflected by a corresponding movement of the fluids 130 and 140 out of the channel. Consequently, by the pump action provided by the water slug 135, the shape of the large meniscus 150 may be changed, thus changing the power of the lens.

Such a lens 300 is an example how it is not necessary for the two liquids providing the meniscus 150 for the lens action to be suitable for electrowetting, the two liquids merely have to be immiscible. In this example only one of the fluids 130, 140 is suitable for electrowetting, with an additional fluid (slug 135) provided to allow the electrowetting effect to be used as a pump. However, it will be appreciated if the fluids are moved by another pump action e.g. a mechanical pump, the range in possible liquids becomes even larger. Appropriate design thus allows a wide choice in the type of fluids selected.

Figure 7:
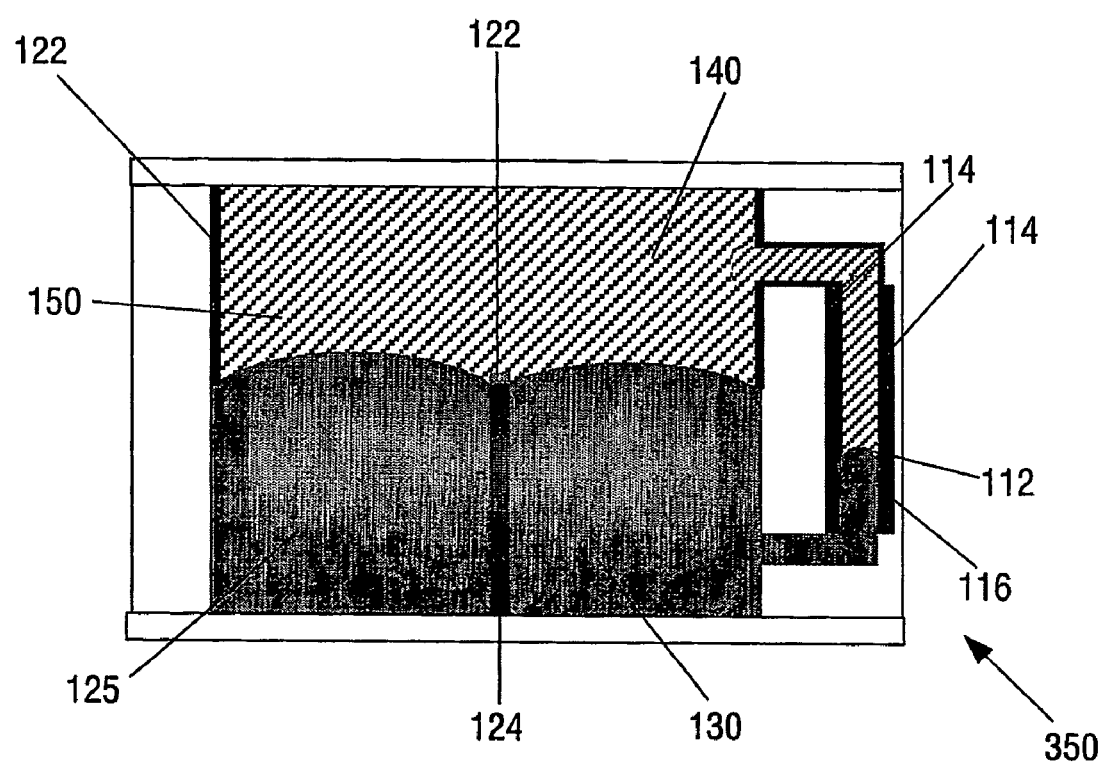
FIG. 7 illustrates a schematic cross-section of a variable lens in accordance with a further embodiment of the present invention.

FIG. 7 shows a lens 350 in accordance with yet a further embodiment of the present invention. The lens 350 is generally similar to the lens 250 shown in FIG. 5. However, in this particular embodiment, a central pillar 124 has been introduced into the chamber 125. The pillar 124 is coated with a hydrophobic layer 122 at the same height (i.e. relative position perpendicular to the optical axis 90) as the outer cylinder wall 122. The result is that the pinned meniscus 150 is donut shaped. The meniscus now introduces no optical power, but does introduce a spherical aberration. The extent of the spherical aberration introduced by the meniscus 150 will depend on the curvature of the donut shaped meniscus, with a wide range of spherical aberration being potentially possible. Consequently, such a lens can be used as an aberration corrector.

In this particular lens 350, the pillar 124 takes the form of a circular cylinder, coaxial with the optical axis 90. However, it will be appreciated that the pillar could in fact take any desired shape, or any desired positon within the chamber 125. The change in wettability on the pillar 124 need not be at the same height as the wettability change on surface 120.

Various types of pump may be used as the pump 110. For instance, international patent application WO 02/069016 describes a number of ways of how fluid can be moved e.g. electro-capillary differential-pressure electro-capillarity, electrowetting, continuous electrowetting, electrophoresis, electroosmosis, dielectrophoresis, electrohydrodynamic pumping, thermocapillary, thermal expansion, dielectric pumping, or variable dielectric pumping, any of which could be used to provide the pump action required by the pump 110. Alternatively, the pump could be a mechanical pump.

Although in the above embodiments, the tube is described as a circular tube (i.e. it has a circular cross-section), it will be appreciated that in fact the tube can have any desired cross-section e.g. square, rectangular or elliptical.

Equally, in the above embodiments, the lens has been described as being formed of two bodies of fluid, with an interface between the fluid providing the lens function. However, it will be appreciated that the lens could in fact comprise any number of bodies of fluids. For instance, the lens could comprise two volumes of oil separated by a volume of water. Consequently, a double lens with two menisci would be produced, each meniscus corresponding to an interface between the water and a respective volume of oil. Each of the two menisci could be pinned. By altering the respective volumes of each of the bodies of fluid (i.e. by altering the volume of water contained within the tube, as well as the volume of each of the bodies of oil within the tube), both of the lens functions provided by the two menisci can be controllably altered.

It will be appreciated that the variable lenses of the present invention can form part of any optical device requiring a lens.

Figure 8:
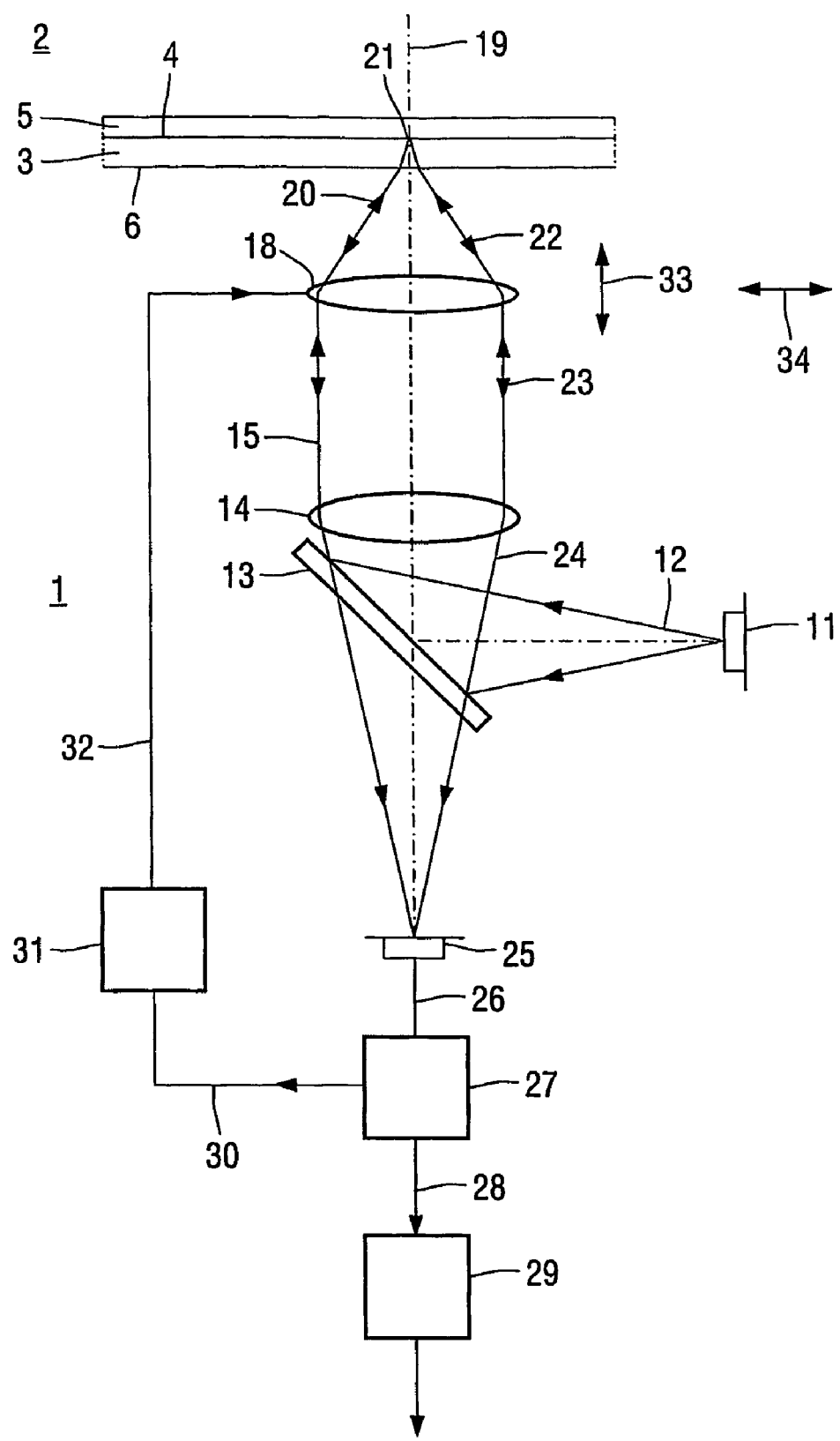
FIG. 8 illustrates a device for scanning an optical record carrier including a variable lens in accordance with an embodiment of the present invention.

FIG. 8 shows a device 1 for scanning an optical record carrier 2, including an objective lens system 18 comprising a variable focus lens in accordance with an embodiment of the present invention. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4.

Information may be stored in the information layer 4 of the record carrier in the form of optically detectable marks arranged in substantially parallel, concentric or spiral tracks, not indicated in FIG. 8. The marks may be in any optically readable form, e.g. in the form of pits, or areas with a reflection coefficient or a direction of magnetization different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 8 in this particular embodiment is adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

For instance, in dual layer BD (Blu-ray Disc) discs, the two information layers are at depths of 0.1 mm and 0.08 mm; they are thus separated by typically 0.02 mm. When refocusing from one layer to another, due to the difference in information layer depth, some 200 mλ of unwanted spherical aberration arises, which needs to be compensated. This can be achieved by introducing spherical aberration into the objective system 18, such that the spherical aberrations cancel out.

In one embodiment of this invention, spherical aberration is introduced into the objective system 18 by altering the collimation of the beam 15 incident upon the objective system 18, by using a variable lens in accordance with the present invention. Such a variable lens can be incorporated as an extra device within the optical path of the beam 15 or the variable lens can form part of the lens 14 (e.g. lens 14 is a compound lens). By varying the shape of the meniscus within the variable lens, the beam 15 can be varied from being parallel, to be slightly converging or diverging as required, so as to introduce the desired spherical aberration.

Figure 9:
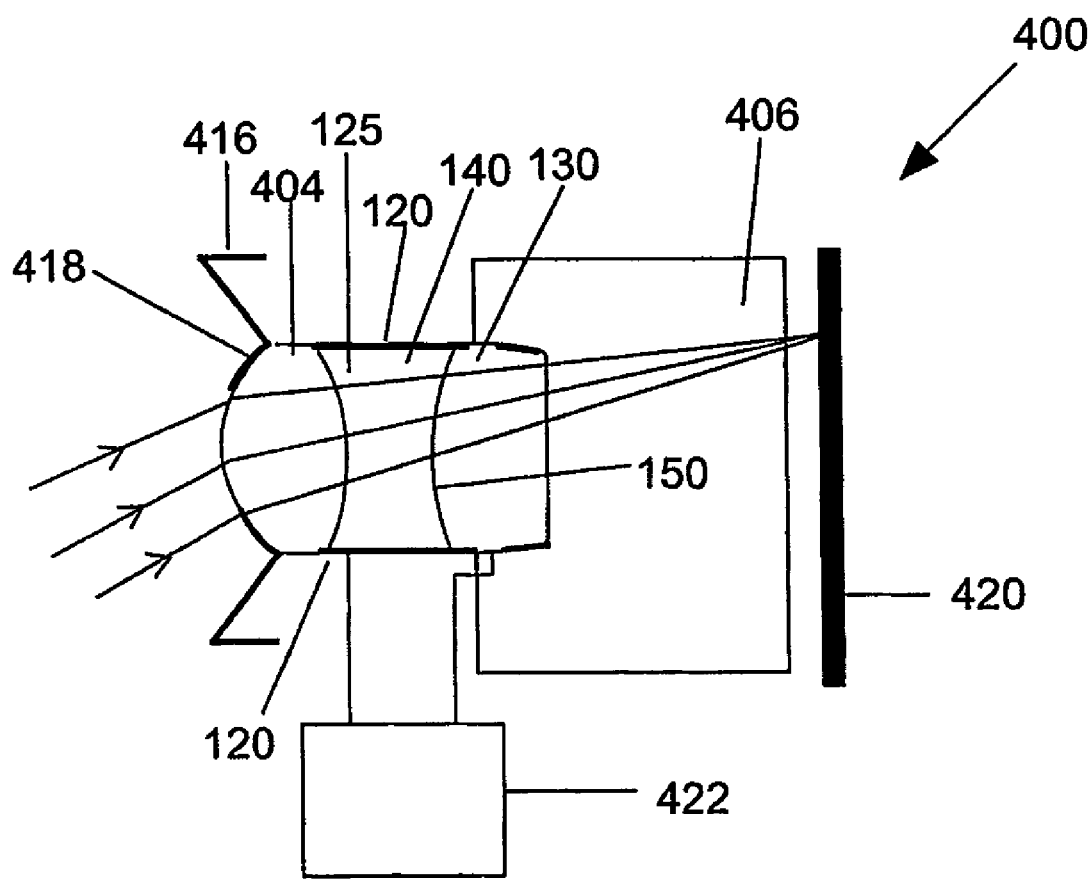
FIG. 9 illustrates a variable focus image capture device including a variable lens in accordance with an embodiment of the present invention.

FIG. 9 illustrates a variable focus image capture device 400 including a lens in accordance with an alternative embodiment of the present invention.

The device 400 includes a compound variable focus lens including a cylindrical tube of surfaces 120, a ridged front lens 404, and ridged rear lens 406. The spacing enclosed by the two lenses and the tube forms a cylindrical fluid chamber 125. The fluid chamber 125 holds the first and second fluids 130 and 140. The two fluids touch along a meniscus 150. The meniscus forms a meniscus lens of variable shape, as previously described, depending upon the respective volume of each fluid provided to the chamber by the pump 422.

The front lens 404 is a convex-convex lens of highly refracting plastic, such as polycarbonate or cyclic olefin copolymer (COC), and having a positive power. At least one of the surfaces of the front lens is aspherical, to provide the desired initial focusing characteristics. The rear lens element 406 is formed of a low dispersive plastic, such as COC, and includes an aspherical lens surface which acts as a field flattener. The other surface of the rear lens element may be flat, spherical or aspherical.

A glare stop 416 and an aperture stop 418 are added to the front of the lens. A pixellated image sensor 420, such as a CMOS (Complementary Metal Oxide Silicon) sensor array, is located in a sensor plane behind the lens.

The pump 422 drives the lens, in accordance with a focus control signal, derived by focus control processing of the image signals, so as to provide an object range of between infinity and 10 cm.

The front lens element 404 is preferably formed as a single body with the tube, the tube being closed off by the rear lens 406 to form a sealed unit. The second lens element 406 may be extended, in relation to that shown in FIG. 8, and the flat rear surface of the lens element 406 may be replaced by an angled mirror surface, preferably angled at 45°, to allow the image sensor 420 to be placed below the lens, in order to reduce the dimensions of the lens.

The inner surfaces of the front lens 404 and the rear lens 406 may be coated with a protective layer to avoid incompatibility of the material from which the lens are made with the fluids 130 and 140. The protective layer may also have anti-reflection characteristics.

From the above examples, it will be appreciated that in embodiments of the present invention, a variable lens is provided in which the shape of the lens can easily be adjusted by controllably altering the shape of the meniscus between the two fluids. As no mechanical components are required within the optical path, then the optical path does not suffer from mechanical wear and tear. Further, the lens may be adjusted between having a positive power and a negative power.

The invention claimed is:

1. A variable lens comprising:
   a chamber;
   an optical axis extending through the chamber;
   the chamber containing a first fluid and a second fluid in contact over a meniscus extending transverse the optical axis, the perimeter of the meniscus being fixedly located on an internal surface of the chamber, the fluids being substantially immiscible and having different indices of refraction;
   at least one pump arranged to controllably alter the shape of the meniscus by altering the relative volume of each of said fluids contained within the chamber; and
   a pillar extending within the chamber and contacting a perimeter of the meniscus, the perimeter of the meniscus being fixedly located on a surface of the pillar.

2. The lens as claimed in claim 1, wherein the perimeter of the meniscus is fixedly located by a change in at least one characteristic of said surface.

3. The lens as claimed in claim 2, wherein the change is a change in the geometry of the surface.

4. The lens as claimed in claim 2, wherein the change is a change in the wettability of said surface.

5. The lens as claimed in claim 1, wherein the pump operates utilizing at least one of: electro-capillary, differential-pressure electro-capillarity, electrowetting, continuous electrowetting, electrophoresis, electroosmosis, dielectrophoresis, electrohydrodynamic pumping, mechanical pumping, thermocapillary, thermal expansion, dielectric pumping, or variable dielectric pumping.

6. The lens as claimed in claim 1, wherein the chamber has a circular, rectangular or elliptical cross-section.

7. The variable lens of claim 1, wherein density of the first fluid and the second fluid are substantially equal.

8. The variable lens of claim 1, wherein the internal surface of the chamber has a first wettability for the first fluid and a second wettability for the second fluid.

9. The variable lens of claim 1, wherein the perimeter of the meniscus is pinned by a change in geometry of the internal surface of the chamber.

10. The variable lens of claim 9, wherein the perimeter of the meniscus is further pinned by a change in wettability of the internal surface of the chamber.

11. The variable lens of claim 1, wherein the at least one pump is a mechanical pump.

12. The variable lens of claim 1, wherein a relative volume of each of said fluids contained within the chamber is controlled by electrowetting.

13. A variable lens comprising:

a chamber;

an optical axis extending through the chamber;

the chamber containing a first fluid and a second fluid in contact over a meniscus extending transverse the optical axis, the perimeter of the meniscus being fixedly located on an internal surface of the chamber, the fluids being substantially immiscible and having different indices of refraction; and at least one pump arranged to controllably alter the shape of the meniscus by altering the relative volume of each of said fluids contained within the chamber;

wherein the chamber further contains a third fluid in contact with the second fluid over a second meniscus extending transverse the optical axis, the perimeter of the second meniscus being fixedly located on an internal surface of the chamber, the second and third fluids being substantially immiscible and having different indices of refraction.

14. The lens as claimed in claim 13, wherein the third fluid and the first fluid are the same material.

15. An optical device comprising a variable lens, the lens comprising:

a chamber;

an optical axis extending through the chamber;

the chamber containing a first fluid and a second fluid in contact over a meniscus extending transverse the optical axis, the perimeter of the meniscus being fixedly located on an internal surface of the chamber, the fluids being substantially immiscible and having different indices of refraction;

at least one pump arranged to controllably alter the shape of the meniscus by altering the relative volume of each of said fluids contained within the chamber; and a pillar extending within the chamber and contacting a perimeter of the meniscus, the perimeter of the meniscus being fixedly located on a surface of the pillar.

16. The optical device as claimed in claim 15, wherein the device is an optical scanning device for scanning an information layer of an optical record carrier, the device comprising a radiation source for generating a radiation beam and an objective system for converging the radiation beam on the information layer.

17. The optical device as claimed in claim 15, wherein the device is a variable focus image capture device.

18. The optical device of claim 15, wherein the perimeter of the meniscus is pinned by a change in geometry of the internal surface of the chamber.

19. The optical device of claim 18, wherein the perimeter of the meniscus is further pinned by a change in wettability of the internal surface of the chamber.

20. A method of manufacturing a variable lens, the method comprising the acts of:

providing a chamber, with an optical axis extending through the chamber;

placing a first fluid and a second fluid in the chamber such that the two fluids are in contact over a meniscus extending transverse the optical axis, the perimeter of the meniscus being fixedly located on an internal surface of the chamber, the fluids being substantially immiscible and having different indices of refraction;

providing at least one pump arranged to controllably alter the shape of the meniscus by altering the relative volume of each of said fluids contained within the chamber; and providing a pillar extending within the chamber and contacting a perimeter of the meniscus, the perimeter of the meniscus being fixedly located on a surface of the pillar.

21. The method of claim 20, wherein the perimeter of the meniscus is pinned by a change in geometry of the internal surface of the chamber.

22. The method of claim 21, wherein the perimeter of the meniscus is further pinned by a change in wettability of the internal surface of the chamber.

23. A method of manufacturing an optical device, the method comprising the acts of:

providing a variable lens, the variable lens comprising:

a chamber; an optical axis extending through the chamber, the chamber containing a first fluid and a second fluid in contact over a meniscus extending transverse the optical axis, the perimeter of the meniscus being fixedly located on an internal surface of the chamber, the fluids being substantially immiscible and having different indices of refraction;

providing at least one pump arranged to controllably alter the shape of the meniscus by altering the relative volume of each of said fluids contained within the chamber; and providing a pillar extending within the chamber and contacting a perimeter of the meniscus, the perimeter of the meniscus being fixedly located on a surface of the pillar.

24. The method of claim 23, wherein the perimeter of the meniscus is pinned by a change in geometry of the internal surface of the chamber.

25. The method of claim 24, wherein the perimeter of the meniscus is further pinned by a change in wettability of the internal surface of the chamber.

26. A variable lens comprising:

a chamber;

an optical axis extending through the chamber;

the chamber containing a first fluid and a second fluid in contact over a meniscus extending transverse the optical axis, the perimeter of the meniscus being fixedly located on an internal surface of the chamber, the fluids being substantially immiscible and having different indices of refraction; and at least one pump arranged to controllably alter the shape of the meniscus by altering the relative volume of each of said fluids contained within the chamber;

wherein a width of the chamber changes along a length of the chamber.

27. A variable lens comprising:

a chamber;

an optical axis extending through the chamber;

the chamber containing a first fluid and a second fluid in contact over a meniscus extending transverse the optical axis, the perimeter of the meniscus being fixedly located on an internal surface of the chamber, the fluids being substantially immiscible and having different indices of refraction; and at least one pump arranged to controllably alter the shape of the meniscus by altering the relative volume of each of said fluids contained within the chamber;

wherein a position on the perimeter where the meniscus is fixedly located on the internal surface of the chamber undergoes an abrupt change in a width of the chamber.

28. A variable lens comprising:

a chamber;

an optical axis extending through the chamber;

the chamber containing a first fluid and a second fluid in contact over a meniscus extending transverse the optical axis, the perimeter of the meniscus being fixedly located on an internal surface of the chamber, the fluids being substantially immiscible and having different indices of refraction; and at least one pump arranged to controllably alter the shape of the meniscus by altering the relative volume of each of said fluids contained within the chamber;

wherein a width of the chamber changes over the length of the chamber, wherein a position where the perimeter of the meniscus is fixedly located on an internal surface of the chamber undergoes an abrupt change in the width of the chamber.

29. A variable lens comprising:
a chamber;
an optical axis extending through the chamber;
the chamber containing a first fluid and a second fluid in contact over a meniscus extending transverse the optical axis, the perimeter of the meniscus being fixedly located on an internal surface of the chamber, the fluids being substantially immiscible and having different indices of refraction; and
at least one pump arranged to controllably alter the shape of the meniscus by altering the relative volume of each of said fluids contained within the chamber;
wherein the perimeter of the meniscus is pinned to at least one of a spike and a triangular shaped portion of the internal surface of the chamber.

30. A variable lens comprising:
a chamber;
an optical axis extending through the chamber;
the chamber containing a first fluid and a second fluid in contact over a meniscus extending transverse the optical axis, the perimeter of the meniscus being fixedly located on an internal surface of the chamber, the fluids being substantially immiscible and having different indices of refraction;
at least one pump arranged to controllably alter the shape of the meniscus by altering the relative volume of each of said fluids contained within the chamber; and
a pillar extending within the chamber and contacting the meniscus so that the meniscus has a substantially donut shape.

31. A variable lens comprising:
a chamber;
an optical axis extending through the chamber;
the chamber containing a first fluid and a second fluid in contact over a meniscus extending transverse the optical axis, the perimeter of the meniscus being fixedly located on an internal surface of the chamber, the fluids being substantially immiscible and having different indices of refraction; and
at least one pump arranged to controllably alter the shape of the meniscus by altering the relative volume of each of said fluids contained within the chamber;
wherein the pillar is coated with a hydrophobic material and extends from one wall of the chamber between two side walls, and wherein portions of the two side walls are coated with the hydrophobic material, the portions extending from a chamber wall opposite the one wall.

32. The variable lens of claim 31, wherein the pillar extends from the one wall to the optical axis, and the portions extend from the chamber wall to the optical axis.

33. An optical device comprising a variable lens, the lens comprising:
a chamber;
an optical axis extending through the chamber;
the chamber containing a first fluid and a second fluid in contact over a meniscus extending transverse the optical axis, the perimeter of the meniscus being fixedly located on an internal surface of the chamber, the fluids being substantially immiscible and having different indices of refraction; and
at least one pump arranged to controllably alter the shape of the meniscus by altering the relative volume of each of said fluids contained within the chamber;
wherein the perimeter of the meniscus is pinned to at least one of a spike and a triangular shaped portion of the internal surface of the chamber.

34. A method of manufacturing a variable lens, the method comprising the acts of:
providing a chamber, with an optical axis extending through the chamber;
placing a first fluid and a second fluid in the chamber such that the two fluids are in contact over a meniscus extending transverse the optical axis, the perimeter of the meniscus being fixedly located on an internal surface of the chamber, the fluids being substantially immiscible and having different indices of refraction; and
providing at least one pump arranged to controllably alter the shape of the meniscus by altering the relative volume of each of said fluids contained within the chamber;
wherein the perimeter of the meniscus is pinned to at least one of a spike and a triangular shaped portion of the internal surface of the chamber.

35. A method of manufacturing an optical device, the method comprising the acts of:
providing a variable lens, the variable lens comprising:
a chamber; an optical axis extending through the chamber, the chamber containing a first fluid and a second fluid in contact over a meniscus extending transverse the optical axis, the perimeter of the meniscus being fixedly located on an internal surface of the chamber, the fluids being substantially immiscible and having different indices of refraction; and
providing at least one pump arranged to controllably alter the shape of the meniscus by altering the relative volume of each of said fluids contained within the chamber;
wherein the perimeter of the meniscus is pinned to at least one of a spike and a triangular shaped portion of the internal surface of the chamber.

36. An optical device comprising a variable lens, the lens comprising:
a chamber;
an optical axis extending through the chamber;
the chamber containing a first fluid and a second fluid in contact over a meniscus extending transverse the optical axis, the perimeter of the meniscus being fixedly located on an internal surface of the chamber, the fluids being substantially immiscible and having different indices of refraction; and
at least one pump arranged to controllably alter the shape of the meniscus by altering the relative volume of each of said fluids contained within the chamber;
wherein a width of the chamber changes along a length of the chamber.

37. A method of manufacturing a variable lens, the method comprising the acts of:
providing a chamber, with an optical axis extending through the chamber, wherein a width of the chamber changes along a length of the chamber;
placing a first fluid and a second fluid in the chamber such that the two fluids are in contact over a meniscus extending transverse the optical axis, the perimeter of the meniscus being fixedly located on an internal surface of the chamber, the fluids being substantially immiscible and having different indices of refraction; and providing at least one pump arranged to controllably alter the shape of the meniscus by altering the relative volume of each of said fluids contained within the chamber.

38. A method of manufacturing an optical device, the method comprising the acts of:
providing a variable lens, the variable lens comprising:
a chamber having a width which changes along a length of the chamber; an optical axis extending through the chamber, the chamber containing a first fluid and a second fluid in contact over a meniscus extending transverse the optical axis, the perimeter of the meniscus being fixedly located on an internal surface of the chamber, the fluids being substantially immiscible and having different indices of refraction; and
providing at least one pump arranged to controllably alter the shape of the meniscus by altering the relative volume of each of said fluids contained within the chamber.

39. A variable lens comprising:
a chamber having a width which changes along a length of the chamber;
an optical axis extending through the chamber;
a first fluid and a second fluid included in the chamber and in contact with each other over a meniscus extending transverse the optical axis;
wherein the chamber is configured to fixedly hold a perimeter of the meniscus on an internal surface of the chamber, the fluids being substantially immiscible and having different indices of refraction; and
at least one pump arranged to controllably alter the shape of the meniscus by altering the relative volume of each of said fluids contained within the chamber.

* * * * *